United States Patent [19]

Langemeier et al.

[11] Patent Number: 4,941,537
[45] Date of Patent: Jul. 17, 1990

[54] METHOD FOR REDUCING THE VISCOSITY OF AQUEOUS FLUID

[75] Inventors: Paul W. Langemeier; Martha A. Phelps; Michael E. Morgan, all of Louisville, Ky.

[73] Assignee: Hi-Tek Polymers, Inc., Jeffersontown, Ky.

[21] Appl. No.: 371,651

[22] Filed: Jun. 22, 1989

Related U.S. Application Data

[63] Continuation of Ser. No. 160,142, Feb. 25, 1988, abandoned.

[51] Int. Cl.$^5$ .............................................. E21B 43/26
[52] U.S. Cl. .................................... 166/308; 166/308; 252/8.551; 252/315.3
[58] Field of Search ................. 252/8.551, 8.51, 315.3; 536/52; 166/300, 308

[56] References Cited

U.S. PATENT DOCUMENTS

| | | | |
|---|---|---|---|
| 3,498,912 | 3/1970 | Kieper et al. | 210/728 |
| 3,808,195 | 4/1974 | Shelso et al. | 536/52 |
| 4,169,798 | 10/1979 | DeMartino | 252/8.551 |
| 4,202,795 | 5/1980 | Burnham et al. | 252/8.551 X |
| 4,552,674 | 11/1985 | Brown et al. | 252/8.551 |
| 4,610,795 | 9/1986 | Norris et al. | 252/8.551 |
| 4,647,385 | 3/1987 | Williams et al. | 252/8.551 |
| 4,701,247 | 10/1987 | Kalnins et al. | 204/131 |
| 4,741,401 | 5/1988 | Walles et al. | 252/8.551 X |

*Primary Examiner*—George A. Suchfield
*Attorney, Agent, or Firm*—Herbert P. Price

[57] ABSTRACT

The viscosity of aqueous fluids thickened with a tertiary amino polygalactomannan is reduced by the addition of an alkali metal or alkaline earth metal salt of hypochlorous acid, or a chlorinated isocyanurate.

24 Claims, No Drawings

METHOD FOR REDUCING THE VISCOSITY OF AQUEOUS FLUID

This is a continuation of co-pending application Ser. No. 07/160,142 filed on Feb. 25, 1988, now abandoned.

BACKGROUND OF THE INVENTION

The field of art to which this invention pertains is water-soluble polymers.

Thickeners for aqueous fluids are used in a number of industrial and personal care applications. However, after the purpose for using the thickened aqueous fluid has been served, it is often desirable to lower the viscosity of the aqueous fluid. This lowering of viscosity is accomplished by using a "breaker" which acts on the water-soluble polymer to reduce its molecular weight and to thin the fluid in which it is dissolved.

The breaking of aqueous gels or thickened aqueous fluids has been accomplished by using a variety of techniques. One such method is by the degradative action of acids, enzymes, or mild oxidizing agents as disclosed in U.S. Pat. No. 4,169,791. In U.S. Pat. No. 4,464,268, sodium hypochlorite is described as being a drastic treating agent for degrading water-soluble polymers. The use of ammonium and alkali metal persulfates in combination with tertiary amines is disclosed in U.S. Pat. No. 4,250,044 as being suitable breaker systems for high viscosity fluids. Lithium hypochlorite is described as a breaker material in *Oil and Gas Journal*, Dec. 12, 1983, pp 96 to 101. The thickening of aqueous fluids and various techniques for reducing the viscosity of the fluids is described in such patents as U.S. Pat. Nos. 3,002,960, 3,779,914, 4,144,179 and 4,552,668. As described in U.S. Pat. No. 4,654,043, starch sizing agents are degraded by treatment with hypochlorites and amino compounds.

In commonly assigned U.S. Pat. No. 4,647,385, the viscosity of thickened aqueous solutions is reduced by the addition of alkali metal and alkaline earth metal salts of hypochlorous acid plus tertiary amines to the solutions. The combination of the salt and the tertiary amine is much more efficient in speed of reduction in viscosity and in the completeness of the degradation of the polymer in the solution than the use of the metal salt alone.

Thickened aqueous fluids are useful in oil recovery processes, particularly in the practice of fracturing subterranean formations. In the fracturing operations, a thickened fluid having granular insoluble particulate material suspended therein, is injected down a well penetrating the formation under hydraulic pressure. The pressurized fluid causes the formation to crack or fracture. The suspended insoluble granular particles are forced into the fractures and prop open the fractures when the fracturing pressures are released. Before the well is put back into operation, the thickened fluid must be removed from the well. Such removal is facilitated if the viscosity can be quickly reduced.

Efficient breaker systems which quickly and completely reduce the viscosity are in demand. Consequently, industry is constantly searching for improvements in breaker systems for thickened aqueous fluids.

SUMMARY OF THE INVENTION

This invention relates to thickened or gelled aqueous fluids. In one aspect, this invention pertains to a process for reducing the viscosity of thickened or gelled aqueous fluids. In another aspect, this invention relates to a process for fracturing subterranean formations.

By the process of this invention, the viscosity of aqueous fluids thickened with a tertiary amino polygalactomannan is reduced by the addition of an alkali metal or an alkaline earth metal salt of hypochlorous acid or a chlorinated isocyanurate.

In applying the process of this invention to the fracturing of subterranean formations penetrated by a borehole, a water based fluid is injected into the borehole and into contact with the formation at a said rate and pressure sufficient to fracture said formation wherein the water-based fluid is made from (a) an aqueous liquid, (b) as a thickening agent to increase the viscosity of the aqueous liquid, a viscosity increasing amount of a tertiary amino polygalactomannan and (c) as a breaker to reduce the viscosity of the fluid after the fluid has contacted the formation and after its intended purpose as a viscous fluid has been served, an effective amount of an alkali metal or alkaline earth metal salt of hypochlorous acid or a chlorinated isocyanurate.

This breaker system is also useful in the drilling and other treatment of oil and gas wells, e.g., for use in drilling fluids and completion and workover fluids. It is also useful in many different types of industrial, personal care, carpet and textile dyeing, or waste treatment processes where a quick break or degradation of thickened aqueous fluids is desired.

DESCRIPTION OF INVENTION

The water soluble polymers which are used to thicken the aqueous fluids of this invention are tertiary amino derivatives of polygalactomannans. Such polymers are made by reacting a polygalactomannan with a dialkylaminoalkyl halide or a dialkylaminoalkyl epoxide using procedures described in U.S. Pat. No. 3,498,912 and Canadian Patent No. 729,632 which are hereby incorporated by reference.

The polygalactomannans from which the tertiaryamino polygalactomannans are derived are hydrocolloid polysaccharides composed principally of galactose and mannose units and are usually found in the endosperm of leguminous seeds, such as guar, locust bean, honey locust, flame tree and the like. Guar, for example, is composed mostly of a galactomannan which is essentially a straight chain mannan with single-membered galactose branches. The mannose units are linked in a 1,4-$\beta$-glycosidic linkage and the galactose branching takes place by means of a 1-6 linkage on alternate mannose units. The ratio of galactose to mannose in the guar polymer is, therefore, one to two.

Locust bean gum is also a polygalactomannan of similar molecular structure in which the ratio of galactose to mannose is one to four. Guar and locust bean gum are the preferred sources of the polygalactomannans, principally because of the commercial vailability thereof.

The tertiary amino derivatizing agents useful in this invention are dialkylaminoalkyl halides or epoxides wherein the alkyl groups contain from 1 to 6 carbon atoms and wherein the total number of carbon atoms does not exceed 12. The halides are chloride, bromide and iodide with the chloride being preferred.

Examples of useful derivatizing agents are dimethylaminomethyl chloride, dimethylaminoethyl chloride, dimethylaminopropyl chloride, methylethylaminopropyl bromide, dimethylaminoisopropyl chloride, methylethylaminoisopropyl chloride, diethylaminobutyl iodide, 3-dimethylamino-1,2-epoxypropane, 3-diethylamino-1,2-epoxypropane and other isomers.

The tertiaryamino polygalactomannans useful in this invention are prepared by reacting the polygalactomannan and the derivatizing agent in aqueous, non-aqueous, or mixed systems using alkali as the condensing or catalytic agent. When the derivatizing agent is the dialkylaminoalkyl halide or halide salt, the amount of alkali used is at least equivalent and, preferably, in excess over the halide present in the derivatizing agent. If the epoxide derivatizing agent is used, then the alkali is used in the catalytic amounts, generally about 0.5 to about 8.0 weight percent based on the weight of the polygalactomannans.

Preferably, the polygalactomannan is suspended in an alcohol i.e., methanol, ethanol or isopropanol, and the derivatizing agent is added. After thorough mixing, an aqueous solution of caustic is added. Heat is then applied raising the temperature to 50°–80° C. When the reaction is completed, the product is isolated and dried.

Useful tertiary amino polygalactomannans have a DS of about 0.001 to about 0.2 and, preferably about 0.001 to about 0.15. A particularly preferred tertiary amino polygalactomannan is dimethylaminopropyl guar having a DS of about 0.004 to about 0.1.

The alkali metal and alkaline earth metal salts of hypochlorous acid useful in this invention are magnesium hypochlorite, strontium hypochlorite, lithium hypochlorite, sodium hypochlorite and potassium hypochlorite. The most preferred metal salts are sodium and calcium hypochlorite.

The chlorinated isocyanurates useful in this invention include trichloro-S-triazine trione, sodium dichloro-S-triazine trione, potassium dichloro-S-triazine trione, sodium dichloro-S-triazine trione dihydrate, and mixtures thereof.

In carrying out the reduction in viscosity of aqueous fluids according to this invention, the aqueous fluid is thickened with about 10 to about 80 pounds of tertiaryamino polygalactomannan per 1000 gallons of aqueous fluid. Preferably the amount of tertiaryamino polygalactomannan will be about 20 to about 60 pounds per 1000 gallons.

The amount of metal hypochlorite or chlorinated isocyanurate used in the thickened aqueous fluid will vary from about 0.1 to about 1.5 pounds per 1000 gallons of aqueous fluid and preferably about 0.5 to about 2 pounds per 1000 gallons.

The thickened aqueous fluid prior to the addition of the hypochlorite salt or chlorinated isocyanurate has a pH of about 6 to about 11 and, preferably, about 7 to about 10. The temperature of the system will vary from about 50° F. to about 300° F. The breaker systems of this invention are particularly useful at a temperature of about 70° to about 250° F.

The following examples describe the invention in more detail. Parts and percentages are by weight unless otherwise designated.

EXAMPLE 1

To a suitable reactor were added 90 parts of guar gum and 200 parts of isopropanol. Agitation was begun and nitrogen was introduced through a sparge. After 1 hour with the temperature at 20° C., the addition of a solution of 31.6 parts of dimethylaminopropyl chloride hydrochloride in 50 parts of water was begun. All of the solution was added in 18 minutes with the temperature rising to 21° C. Ten minutes after the completion of the addition, a solution of 36 parts of a 50 percent solution of sodium hydroxide dissolved in 22 parts of water was added over a 12 minute period with the temperature rising to 28° C. Heat was applied raising the temperature to 60° C. in 20 minutes. The temperature was held at 60° C. for 2 hours. The temperature was then reduced to room temperature, and the derivatized guar product was washed three time with a 50/50 methanol water mixture. After filtering, the product was washed with 500 parts by volume of acetone. The product was spread on a tray to air dry. After one day at room temperature, 90.3 parts of powder were recovered.

The derivatized guar powder was added to an aqueous solution containing 2 percent potassium chloride in the amount of 40 pound to 1000 gallons of aqueous solution. After hydrating for 2 hours, the pH which was 6 was adjusted to 8.0 with dilute sodium hydroxide. The viscosity was 31.2 cps at 511 reciprocal seconds as measured on a Fann Model 35A Viscometer. To 400 parts by volume of the thickened solution was added 0.9 part by volume of a 3 percent aqueous calcium hypochlorite solution. The viscosity was 7.0 cps after 30 seconds and 6.0 cps in 30 minutes.

EXAMPLE 2

To a suitable reactor were added 90 parts of guar gum and 200 parts of isopropanol. After agitating for one hour at 21° C. under nitrogen sparge, a solution of 12 parts of a 50 percent aqueous sodium hydroxide solution in 32 parts of water was added over 11 minutes with the temperature rising to 24° C. Heat was applied raising the temperature to 45° C. wherein the addition of a solution of 7.9 parts of dimethylaminopropyl chloride hydrochloride in 50 parts of water was begun. The addition was completed in 8 minutes while the temperature rose to 56° C. The temperature was then raised to 70° C. in 7 minutes and was held at 70° C. for two hours. The temperature was lowered to room temperature, and the derivatized guar product was washed 3 times with 800 parts by volume of a 50/50 methanol/water solution. After filtering, the guar derivative product was washed with 500 parts by volume of acetone. The product was spread on a tray to air-dry. After one days at room temperature, 90.8 parts of derivatized product were recovered.

Using the procedure described in Example 1, an aqueous fluid was made from the derivatized guar product and a 2 percent aqueous potassium chloride solution in the amount of 40 pounds of derivatized guar per 1000 gallons of aqueous solution. The viscosity at pH 8.0 was 30.4 cps. Thirty seconds after the injection of a 3 percent calcium hypochlorite solution (0.9 parts by volume to 400 parts by volume), the viscosity was 10 cps. After 30 minutes, the viscosity was 8.2 cps.

EXAMPLE 3

Using the same procedure described in Example 1, 90 parts of guar gum, dispersed in 200 parts of isopropanol, were mixed with a solution of 7.2 parts of dimethylaminoethyl chloride hydrochloride in 50 parts of water followed by reaction at 70° C. with a solution of 12 parts of a 50 percent solution of sodium hydroxide in 44 parts of water. After washing and drying, 91.5 parts of derivatized guar powder were recovered.

An aqueous fluid containing 40 pounds of the derivatized guar in 1000 gallons of water had a viscosity of 31.0 cps at pH 8. Thirty seconds after the addition of a 3 percent calcium hypochlorite solution (0.9 part/400 parts), the viscosity was 9.2 cps. After 30 minutes, the viscosity was 7.6 cps.

EXAMPLE 4

Using the same procedure described in Example 1, 90 parts of guar gum, dispersed in 200 parts of isopropanol, were mixed with a solution of 7.9 parts of dimethylaminoisopropyl chloride hydrochloride in 50 parts of water and were reacted at 70° C. with a solution of 12 parts of 50 percent aqueous sodium hydroxide in 44 parts of water. After washing and drying, 91.4 parts of derivatized guar gum product were recovered.

An aqueous fluid containing 40 pounds of the derivatized guar product in 1000 gallons of water had a viscosity of 36.4 cps at pH 8.0. Thirty seconds after the addition of a 3 percent calcium hypochlorite solution (0.9 part/400 parts), the viscosity was 9.0 cps. After 30 minutes, the viscosity was 7.2 cps.

EXAMPLE 5

To a suitable reactor was added a solution of 2.2 parts of dimethylaminopropyl chloride hydrochloride in 120 parts of water. Double purified guar splits, 100 parts, were added, the reactor was sealed and was purged three times with nitrogen. Borax, 0.2 part, in 5 parts of water was added. Heat was applied raising the temperature to 181° F. A 50 percent aqueous solution of sodium hydroxide, 26 parts, was added, plus 5 parts of water. Nitrogen was applied to a pressure of 5 psig and heating at 181° F. was continued for one hour. The temperature was cooled to 110° F. and the reactor contents were washed 3 times with water. The derivatized guar splits were then milled and dried under heated air.

An aqueous fluid containing 40 pounds of the derivatized product in 1000 gallons of water had a viscosity of 34.8 cps at pH of 8.0. Thirty seconds after the addition of a 3 percent calcium hypochlorite solution (0.9 part/400 parts), the viscosity was 8 cps. After 30 minutes, the viscosity was 6.6 cps.

EXAMPLE 6

Aqueous fluids were made from underivatized guar, hydroxypropyl guar and dimethylaminopropyl guar (DS-0.1) at a concentration of 40 pounds per 1000 gallons of water. The viscosities of the aqueous fluids were measured using the procedure described in Example 1. A 3 percent solution of calcium hypochlorite in water was added to each fluid on the basis of 1 pound of calcium hypochlorite per 1000 gallons of fluid at a temperature of 80° F. The viscosities were measured at various time intervals. The data are listed in the Table I.

TABLE I

| Gum | Base Viscosity of Gum | Viscosity After Addition of Hypochlorite | | | | | | | |
| --- | --- | --- | --- | --- | --- | --- | --- | --- | --- |
| | | 30 sec. | 1 min. | 2 min. | 3 min. | 5 min. | 10 min. | 30 min. | 1 hr |
| Guar | 34 | 34 | 34 | 34 | 33 | 33 | 33 | 32 | 32 |
| Hydroxypropyl Guar | 31 | 27 | 25 | 24 | 23 | 21 | 20 | 18 | 18 |
| Dimethylaminopropyl Guar | 32 | 4 | 4 | 4 | 4 | 4 | 4 | 3 | — |

EXAMPLE 7

An aqueous fluid was made from dimethylaminopropyl guar (DS-0.1) at a concentration of 40 pounds per 1000 gallons of water. The viscosity using the procedure described in Example 1 was 28 cps. A 3 percent solution of sodium dichloro-S-triazine trione was added on the basis of 1 pound of the trione per 1000 gallons of fluid at a temperature of 80° F. The viscosity after 30 seconds was 5.4 cps and after 1 hour 4.6 cps.

The principles, preferred embodiments and modes of operation of the present invention have been described in the foregoing specification. The invention which is intended to be protected herein, however, is not to be construed as limited to the particular forms disclosed, since there are to be regarded as illustrating rather than restrictive. Variations and changes may be made by those skilled in the art without departing from the spirit of the invention.

What is claimed is:

1. A process for reducing the viscosity of aqueous fluid thickened with a tertiary amino polygalactomannan wherein the tertiary amino group substituted on the polygalactomannan is derived from a dialkylaminoalkyl halide or a dialkylaminoalkyl epoxide wherein the alkyl groups of said halide or said epoxide contain from 1 to 6 carbon atoms and wherein the total number of carbon atoms in the alkyl groups does not exceed 12 which comprises adding to the aqueous fluid an alkali metal or an alkaline earth metal salt of hypochlorous acid or a chlorinated isocyanurate.

2. The process of claim 1 wherein the halide is chloride.

3. The process of claim 1 wherein the tertiary amino polygalactomannan is dimethylaminopropyl guar.

4. The process of claim 1 wherein the tertiary amino polygalactomannan is dimethylaminoethyl guar.

5. The process of claim 1 wherein the tertiary amino polygalactomannan is dimethylaminoisopropyl guar.

6. The process of claim 1 wherein the alkali metal is sodium.

7. The process of claim 1 wherein the alkaline earth metal is calcium.

8. The process of claim 1 wherein the chlorinated isocyanurate is sodium dichloro-S-triazine trione.

9. The process of claim 1 wherein the aqueous fluid contains about 10 to about 80 pounds of tertiary amino polygalactomannan per 1000 gallons of aqueous fluid.

10. The process of claim 9 wherein the aqueous fluid contains about 20 to about 60 pounds of tertiary amino polygalactomannan per 1000 gallons of aqueous fluid.

11. The process of claim 1 wherein the alkali metal or alkaline earth metal salt of hypochlorous acid, or the chlorinated isocyanurate is added in the amount of about 0.1 to about 5 pounds per 1000 gallons of aqueous fluid.

12. The process of claim 11 wherein the alkali metal or alkaline earth metal salt of hypochlorous acid or the chlorinated isocyanurate is added in the amount of about 0.5 to about 2 pounds per 1000 gallons of aqueous fluid.

13. A process for fracturing a subterranean formation penetrated by a borehole which comprises injecting into the borehole and into contact with the formation at a rate and pressure sufficient to fracture said formation a water-based fluid comprising:
   (a) an aqueous liquid;
   (b) as a thickening agent to increase the viscosity of the aqueous liquid a viscosity increasing amount of a tertiary amino polygalactomannan wherein the tertiary amino group substituent on the polygalactomannan is derived from a dialkylaminoalkyl halide or a dialkylaminoalkyl epoxide wherein the alkyl groups of said halide or said epoxide contain from 1 to 6 carbon atoms and wherein the total number of carbon atoms in the alkyl groups does not exceed 12; and
   (c) as a breaker to reduce the viscosity of the fluid after said fluid has contacted the formation and after its intended purpose as a viscous fluid has been served an effective amount of an alkali metal or alkaline earth metal salt of hypochlorous acid, or a chlorinated isocyanurate.

14. The process of claim 13 wherein the halide is chloride. atoms and wherein the total number of carbon atoms does not exceed 12.

15. The process of claim 13 wherein the tertiary amino polygalactomannan is dimethylaminopropyl guar.

16. The process of claim 13 wherein the tertiary amino polygalactomannan is dimethylaminoethyl guar.

17. The process of claim 13 wherein the tertiary amino polygalactomannan is dimethylaminoisopropyl guar.

18. The process of claim 13 wherein the alkali metal is sodium.

19. The process of claim 13 wherein the alkaline earth metal is calcium.

20. The process of claim 13 wherein the chlorinated isocyanurate is sodium dichloro-S-triazine trione.

21. The process of claim 13 wherein the aqueous fluid contains about 10 to about 80 pounds of tertiary aminopolygalactomannan per 1000 gallons of aqueous fluid.

22. The process of claim 21 wherein the aqueous fluid contains about 20 to about 60 pounds of tertiary amino polygalactomannan per 1000 gallons of aqueous fluid.

23. The process of claim 21 wherein the alkali metal or alkaline earth metal salt of hypochlorous acid or chlorinated isocyanurate is added in the amount of about 0.5 to about 2 pounds per 1000 gallons of aqueous fluid.

24. The process of claim 13 wherein the alkali metal or alkaline earth metal salt of hypochlorous acid or chlorinated isocyanurate is added in the amount of about 0.1 to about 5 pounds per 1000 gallons of aqueous fluid.

* * * * *